US012777456B2

(12) United States Patent
Chin et al.

(10) Patent No.: US 12,777,456 B2
(45) Date of Patent: Oct. 27, 2026

(54) METHOD AND APPARATUS FOR OPTIMIZING CONNECTIVITY QUALITY FOR WIRELESS DEVICES

(71) Applicant: AIRGAIN, Inc., San Diego, CA (US)

(72) Inventors: Cheng-Yuan Chin, San Diego, CA (US); Ali Sadri, San Diego, CA (US)

(73) Assignee: Airgain, Inc., San Diego, CA (US)

( * ) Notice: Subject to any disclaimer, the term of this patent is extended or adjusted under 35 U.S.C. 154(b) by 378 days.

(21) Appl. No.: 18/529,093

(22) Filed: Dec. 5, 2023

(65) Prior Publication Data

US 2024/0224226 A1 Jul. 4, 2024

Related U.S. Application Data

(60) Provisional application No. 63/437,002, filed on Jan. 4, 2023.

(51) Int. Cl.

| | |
|---|---|
| ***H04W 64/00*** | (2009.01) |
| ***H04B 17/23*** | (2015.01) |
| *H04W 84/06* | (2009.01) |

(52) U.S. Cl.

CPC .......... *H04W 64/006* (2013.01); *H04B 17/23* (2015.01); *H04W 84/06* (2013.01)

(58) Field of Classification Search

CPC .... H04W 64/006; H04W 84/06; H04B 17/23; H04B 17/24; H04B 17/27; H04B 17/309; H04B 17/318

See application file for complete search history.

(56) References Cited

U.S. PATENT DOCUMENTS

| | | | | |
|---|---|---|---|---|
| 8,525,746 | B2 | 9/2013 | Petrucci | |
| 9,083,414 | B2 | 7/2015 | Basnayake | |
| 9,946,906 | B2 | 4/2018 | Ricci | |
| 10,849,034 | B1 * | 11/2020 | Chisu | H04W 64/006 |
| 2007/0171137 | A1 | 7/2007 | Mierzwa | |
| 2012/0040664 | A1 | 2/2012 | Kamdar | |
| 2012/0098717 | A1 | 4/2012 | Petrucci | |

(Continued)

OTHER PUBLICATIONS

International Patent Application No. PCT/US2023/082435, filed Dec. 5, 2023; International Search Report / Written Opinion / issued Mar. 22, 2024; 23 pages.

(Continued)

*Primary Examiner* — Kenneth T Lam
(74) *Attorney, Agent, or Firm* — Mueting Raasch Group

(57) ABSTRACT

A primary wireless device communicates with a remote signal source. A secondary wireless device is detachably coupled to, and in wireless communication with, the primary wireless device. The primary and secondary wireless devices are moved together about a premises. The primary wireless device produces signal quality information for a signal received from the remote signal source while moving the primary and secondary wireless devices. The signal quality information is communicated from the primary wireless device to the secondary wireless device. The secondary wireless device produces an output indicative of the signal quality information. The primary wireless device is positioned at a location of the premises that produces signal quality information which meets or exceeds a signal quality threshold. The secondary wireless device is detached from the primary wireless device.

25 Claims, 10 Drawing Sheets

(56) References Cited

U.S. PATENT DOCUMENTS

| | | | | |
|---|---|---|---|---|
| 2019/0116500 | A1 | 4/2019 | Bendlin | |
| 2020/0084645 | A1* | 3/2020 | Jones | H04W 24/00 |
| 2021/0075522 | A1* | 3/2021 | Pettygrove | H04B 17/101 |
| 2021/0136681 | A1* | 5/2021 | Mai | G08B 13/24 |
| 2021/0259032 | A1* | 8/2021 | Selea | H04W 76/14 |
| 2022/0094777 | A1* | 3/2022 | Yeatts | H04M 1/72406 |
| 2024/0163693 | A1* | 5/2024 | Yang | H04W 24/02 |
| 2024/0171994 | A1* | 5/2024 | Hatamian | H01Q 21/065 |
| 2025/0202103 | A1* | 6/2025 | Jaldén | H04B 7/06952 |

OTHER PUBLICATIONS

Verizon, Cradlepoint device, R2155-5GB (child), 2022, 3 pages.
Verizon, Cradlepoint device, R2105-5GB, 2022, 3 pages.

* cited by examiner

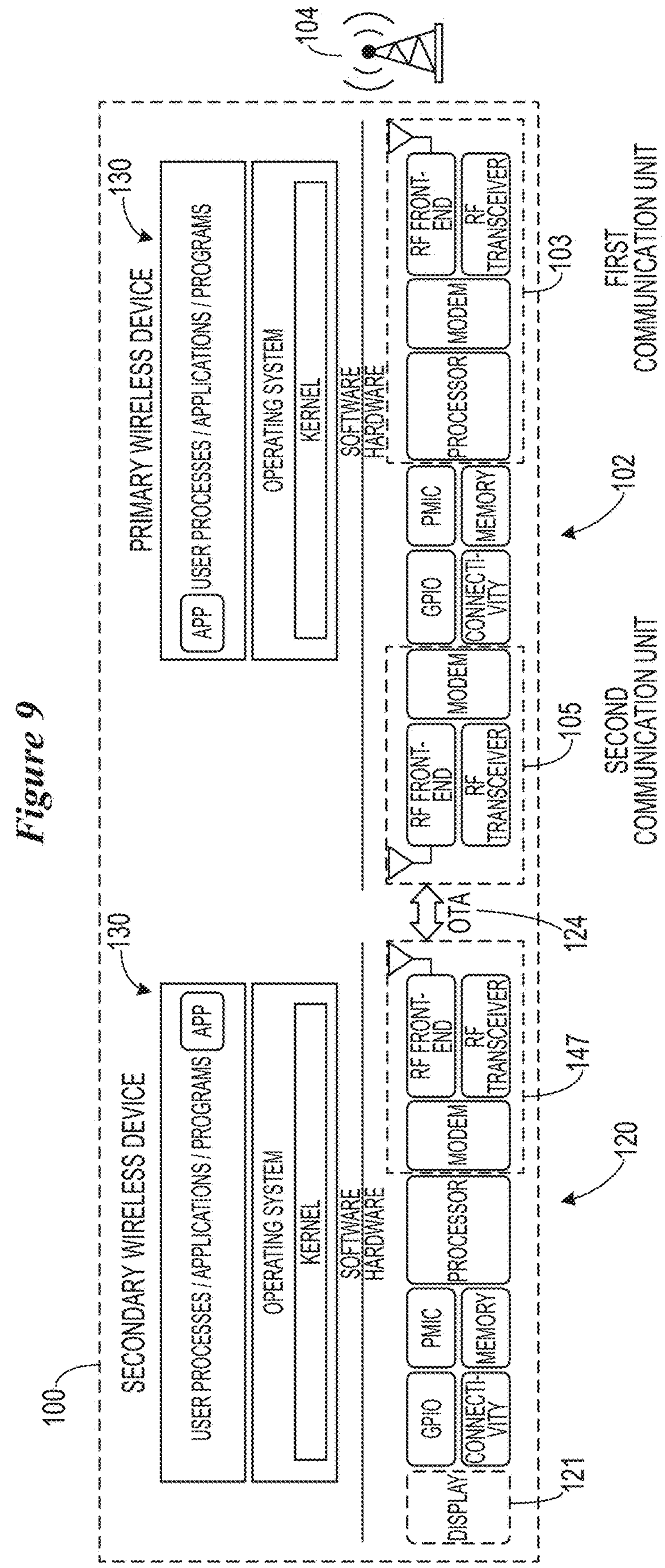
Figure 9
104
100
SECONDARY WIRELESS DEVICE
130
USER PROCESSES / APPLICATIONS / PROGRAMS
APP
OPERATING SYSTEM
KERNEL
SOFTWARE
HARDWARE
DISPLAY
121
GPIO
CONNECTI-VITY
PMIC
MEMORY
PROCESSOR
MODEM
RF FRONT-END
RF TRANSCEIVER
147
120
OTA
124
PRIMARY WIRELESS DEVICE
130
USER PROCESSES / APPLICATIONS / PROGRAMS
APP
OPERATING SYSTEM
KERNEL
SOFTWARE
HARDWARE
RF FRONT-END
RF TRANSCEIVER
MODEM
105
SECOND COMMUNICATION UNIT
GPIO
CONNECTI-VITY
PMIC
MEMORY
102
PROCESSOR
MODEM
RF FRONT-END
RF TRANSCEIVER
103
FIRST COMMUNICATION UNIT

METHOD AND APPARATUS FOR OPTIMIZING CONNECTIVITY QUALITY FOR WIRELESS DEVICES

CROSS-REFERENCE TO RELATED APPLICATION

This application claims the benefit of U.S. Provisional Patent Application No. 63/437,002, filed Jan. 4, 2023, which is incorporated herein by reference in its entirety.

SUMMARY

Some embodiments are directed to a method that involves providing a primary wireless device that communicates with a remote signal source, and providing a secondary wireless device detachably coupled to, and in wireless communication with, the primary wireless device. The method involves moving the primary and secondary wireless devices together about a premises, and producing, by the primary wireless device, signal quality information for a signal received from the remote signal source while moving the primary and secondary wireless devices. The method also involves communicating the signal quality information to the secondary wireless device, and producing, by the secondary wireless device, an output indicative of the signal quality information. The method further involves positioning the primary wireless device at a location of the premises that produces signal quality information which meets or exceeds a signal quality threshold.

Some embodiments are directed to a method that involves providing a primary wireless device that receives a signal from a remote signal source, the primary wireless device operably coupled to a movable antenna. The method involves providing a secondary wireless device detachably coupled to the antenna and in wireless communication with the primary wireless device. The method also involves moving the antenna and the secondary wireless device together about a premises, and producing, by the primary wireless device, signal quality information for a signal received from the remote signal source while moving the antenna together with the secondary wireless device. The method further involves communicating the signal quality information to the secondary wireless device, and producing, by the secondary wireless device, an output indicative of the signal quality information. The method also involves positioning the antenna at a location of the premises that produces signal quality information which meets or exceeds a signal quality threshold.

Some embodiments are directed to an apparatus comprising a primary wireless device configured to communicate with a remote signal source and generate signal quality information for a signal received from the remote signal source. A secondary wireless device is configured to detachably couple to, and wirelessly communicate with, the primary wireless device. The secondary wireless device comprises a processor configured to acquire signal quality information from the primary wireless device while the primary and secondary wireless devices are moved together about a premises, and produce an output indicative of the signal quality information.

Some embodiments are directed to a primary wireless device configured to communicate with a remote signal source and to generate signal quality information for a signal received from the remote signal source. The primary wireless device is operably coupled to a movable antenna. A secondary wireless device is configured to detachably couple to the antenna. The secondary wireless device is configured to wirelessly communicate with the primary wireless device. The secondary wireless device comprises a processor configured to acquire signal quality information from the primary wireless device while the antenna and the secondary wireless device are moved together about a premises, and produce an output indicative of the signal quality information.

BRIEF DESCRIPTION OF THE DRAWINGS

Throughout the specification reference is made to the appended drawings wherein:

FIG. 9 illustrates a movable apparatus comprising a primary wireless device physically and communicatively coupled to a secondary wireless device in accordance with various embodiments.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
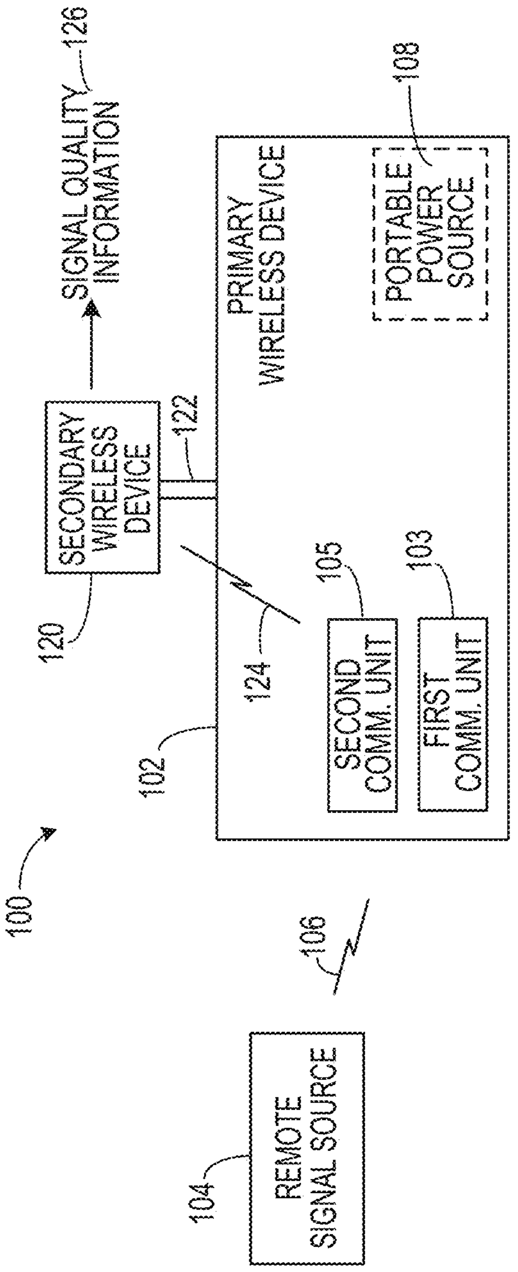
FIG. 1A illustrates a movable apparatus comprising a primary wireless device physically and communicatively coupled to a secondary wireless device in accordance with various embodiments.

Embodiments of the disclosure are directed to an apparatus and method for optimizing connectivity quality for wireless devices. Embodiments of the disclosure facilitate optimal positioning of a primary wireless device or an external antenna of the primary wireless device with the use of a secondary wireless device. During an installation process, the secondary wireless device is physically connected to the primary wireless device or the external antenna, and is communicatively coupled to the primary wireless device. After completing the installation process, the secondary wireless device is removed from the primary wireless device.

With the secondary wireless device connected to the primary wireless device or an external antenna, these combined components define a movable apparatus that produces signal quality information which can be used by an installer to position the primary wireless device or the external antenna at a location that provides for reliable (e.g., optimal) communication with a remote signal source. The movable apparatus can be viewed as an apparatus that emulates a signal sniffer which monitors the quality of signals communicated between the primary wireless device and the remote signal source. Signal quality information produced by the movable apparatus can be communicated to the installer (e.g., a human or a robot) using an output device of the secondary wireless device. The installer can use the signal quality information to position the primary wireless device or the external antenna at a location and orientation that provides for reliable communication with the remote signal source.

In some embodiments, the primary wireless device can be wireless customer premise equipment (CPE) (e.g., 5G CPE) or a Fixed Wireless Access (FWA) device to be installed at a premises, such as a home. The primary wireless device includes a first communication unit configured to communicate with a remote signal source, such as a base station. In other embodiments, the primary wireless device can be a wireless device which is connected to an external antenna. For example, the primary wireless device can be a satellite communication (satcom) receiver connected to a satellite dish. In another example, the primary wireless device can be indoor CPE connected to an external (e.g., outdoor) antenna.

The primary wireless device includes, or is coupled to, a second communication unit that allows the primary wireless device to communicate with the secondary wireless device. The secondary wireless device can be a smartphone, tablet or small computer, for example. In some approaches, the second communication unit is an internal unit of the primary wireless device. In other approaches, the second communication unit is implemented as a communication module which can be coupled to the primary wireless device.

Installing wireless CPE, an FWA device, or a satellite dish at a home, for example, is typically performed by a skilled technician, which can be costly to the homeowner. Embodiments of the disclosure enable the average homeowner to position and install wireless CPE, an FWA device, a satellite dish, and other wireless device without the need of specialized skills or diagnostic tools.

Embodiments of the disclosure are defined in the claims. However, below there is provided a non-exhaustive listing of non-limiting examples. Any one or more of the features of these examples may be combined with any one or more features of another example, embodiment, or aspect described herein.

Example Ex1. A method comprises providing a primary wireless device that communicates with a remote signal source, providing a secondary wireless device detachably coupled to, and in wireless communication with, the primary wireless device, moving the primary and secondary wireless devices together about a premises, producing, by the primary wireless device, signal quality information for a signal received from the remote signal source while moving the primary and secondary wireless devices, communicating the signal quality information to the secondary wireless device, producing, by the secondary wireless device, an output indicative of the signal quality information, and positioning the primary wireless device at a location of the premises that produces signal quality information which meets or exceeds a signal quality threshold.

Example Ex2. The method according to Ex1, wherein producing the output by the secondary wireless device comprises producing a human-perceivable indication of the signal quality information.

Example Ex3. The method according to Ex1, wherein producing the output by the secondary wireless device comprises displaying the signal quality information on a display of the secondary wireless device.

Example Ex4. The method according to Ex1, wherein producing the output by the secondary wireless device comprises producing a data signal indicative of the signal quality information.

Example Ex5. The method according to Ex1, comprising moving the primary and secondary wireless devices to a plurality of different locations of the premises and acquiring, by the secondary wireless device, signal quality information and additional information at each of the plurality of different locations.

Example Ex6. The method according to Ex5, wherein the additional information comprises one or more of a timestamp, a GPS coordinate, a height of the primary wireless device, an azimuth angle of the primary wireless device, and an elevation angle of the primary wireless device.

Example Ex7. The method according to Ex5 or Ex6, wherein the moving and acquiring processes are repeated until a data acquisition criterion is met.

Example Ex8. The method according to Ex7, wherein the data acquisition criterion comprises an iteration criterion specifying a number of times the moving and acquiring processes are to be performed.

Example Ex9. The method according to one or more of Ex1 to Ex8, comprising coupling a portable power source to the primary wireless device and supplying power to the primary wireless device via the portable power source.

Example Ex10. The method according to one or more of Ex1 to Ex9, wherein the primary wireless device comprises an internal communication unit to facilitate wireless communication with the secondary wireless device.

Example Ex11. The method according to one or more of Ex1 to Ex9, wherein the primary wireless device comprises an interface coupled to an external communication module that facilitates wireless communication between the primary wireless device and the secondary wireless device.

Example Ex12. The method according to one or more of Ex1 to Ex11, wherein the primary wireless device comprises wireless customer premise equipment and the remote signal source is a base station.

Example Ex13. The method according to one or more of Ex1 to Ex12, wherein the secondary wireless device comprises a smartphone, a tablet, or a portable computer.

Example Ex14. A method comprises providing a primary wireless device that receives a signal from a remote signal source, the primary wireless device operably coupled to a movable antenna, providing a secondary wireless device detachably coupled to the antenna and in wireless communication with the primary wireless device, moving the antenna and the secondary wireless device together about a premises, producing, by the primary wireless device, signal quality information for a signal received from the remote signal source while moving the antenna together with the secondary wireless device, communicating the signal quality information to the secondary wireless device, producing, by the secondary wireless device, an output indicative of the signal quality information, and positioning the antenna at a location of the premises that produces signal quality information which meets or exceeds a signal quality threshold.

Example Ex15. The method according to Ex14, wherein the primary wireless device comprises wireless customer premise equipment situated within a structure of the premises, the remote signal source is a base station, and the antenna is situated external of the structure.

Example Ex16. The method according to Ex14, wherein the primary wireless device comprises a satellite receiver, the remote signal source is a satellite, and the antenna is a satellite dish.

Example Ex17. The method according to Ex14, wherein producing the output by the secondary wireless device comprises producing a human-perceivable indication of the signal quality information.

Example Ex18. The method according to Ex14, wherein producing the output by the secondary wireless device comprises displaying the signal quality information on a display of the secondary wireless device.

Example Ex19. The method according to Ex14, wherein producing the output by the secondary wireless device comprises producing a data signal indicative of the signal quality information.

Example Ex20. The method according to Ex14, comprising moving the antenna and secondary wireless device to a plurality of different locations of the premises and acquiring, by the secondary wireless device, signal quality information and additional information at each of the plurality of different locations.

Example Ex21. The method according to Ex20, wherein the additional information comprises one or more of a timestamp, a GPS coordinate, a height of the antenna, an azimuth angle of the antenna, and an elevation angle of the antenna.

Example Ex22. The method according to Ex20 or Ex21, wherein the moving and acquiring processes are repeated until a data acquisition criterion is met.

Example Ex23. The method according to Ex22, wherein the data acquisition criterion comprises an iteration criterion specifying a number of times the moving and acquiring processes are to be performed.

Example Ex24. The method according to one or more of Ex14 to Ex23, wherein the primary wireless device comprises an internal communication unit to facilitate wireless communication with the secondary wireless device.

Example Ex25. The method according to one or more of Ex14 to Ex23, wherein the primary wireless device comprises an interface coupled to an external communication module that facilitates wireless communication between the primary wireless device and the secondary wireless device.

Example Ex26. The method according to one or more of Ex14 to Ex25, wherein the primary wireless device comprises wireless customer premise equipment and the remote signal source is a base station.

Example Ex27. The method according to one or more of Ex14 to Ex26, wherein the secondary wireless device comprises a smartphone, a tablet, or a portable computer.

Example Ex28. An apparatus comprises a primary wireless device configured to communicate with a remote signal source and generate signal quality information for a signal received from the remote signal source, and a secondary wireless device configured to detachably couple to, and wirelessly communicate with, the primary wireless device. The secondary wireless device comprises a processor configured to acquire signal quality information from the primary wireless device while the primary and secondary wireless devices are moved together about a premises, and produce an output indicative of the signal quality information.

Example Ex29. The apparatus according to Ex28, comprising a portable power source detachably connected to the primary wireless device via a mechanical coupler.

Example Ex30. The apparatus according to Ex28, wherein the secondary wireless device comprises a display for graphically presenting the output indicative of the signal quality information.

Example Ex31. The apparatus according to one or more of Ex28 to Ex30, wherein the primary wireless device comprises an internal communication unit to facilitate wireless communication with the secondary wireless device.

Example Ex32. The apparatus according to one or more of Ex28 to Ex30, wherein the primary wireless device comprises an interface coupled to an external communication module that facilitates wireless communication between the primary wireless device and the secondary wireless device.

Example Ex33. The apparatus according to one or more of Ex28 to Ex32, wherein the primary wireless device comprises wireless customer premise equipment and the remote signal source is a base station.

Example Ex34. The apparatus according to one or more of Ex28 to Ex33, wherein the secondary wireless device comprises a smartphone, a tablet, or a portable computer.

Example Ex35. An apparatus comprises a primary wireless device configured to communicate with a remote signal source and to generate signal quality information for a signal received from the remote signal source, the primary wireless device operably coupled to a movable antenna, and a secondary wireless device configured to detachably couple to the antenna, the secondary wireless device configured to wirelessly communicate with the primary wireless device. The secondary wireless device comprises a processor configured to acquire signal quality information from the primary wireless device while the antenna and the secondary wireless device are moved together about a premises, and produce an output indicative of the signal quality information.

Example Ex36. The apparatus according to Ex35, wherein the secondary wireless device comprises a display for graphically presenting the output indicative of the signal quality information.

Example Ex37. The apparatus according to Ex35 or Ex36, wherein the primary wireless device comprises an internal communication unit to facilitate wireless communication with the secondary wireless device.

Example Ex38. The apparatus according to one or more of Ex35 to Ex37, wherein the primary wireless device comprises an interface coupled to an external communication module that facilitates wireless communication between the primary wireless device and the secondary wireless device.

Example Ex39. The apparatus according to one or more of Ex35 to Ex38, wherein the primary wireless device comprises wireless customer premise equipment and the remote signal source is a base station.

Example Ex40. The apparatus according to one or more of Ex35 to Ex38, wherein the primary wireless device comprises a satcom receiver and the remote signal source is a satellite.

Example Ex41. The apparatus according to one or more of Ex35 to Ex40, wherein the secondary wireless device comprises a smartphone, a tablet, or a portable computer.

Figure 1B:
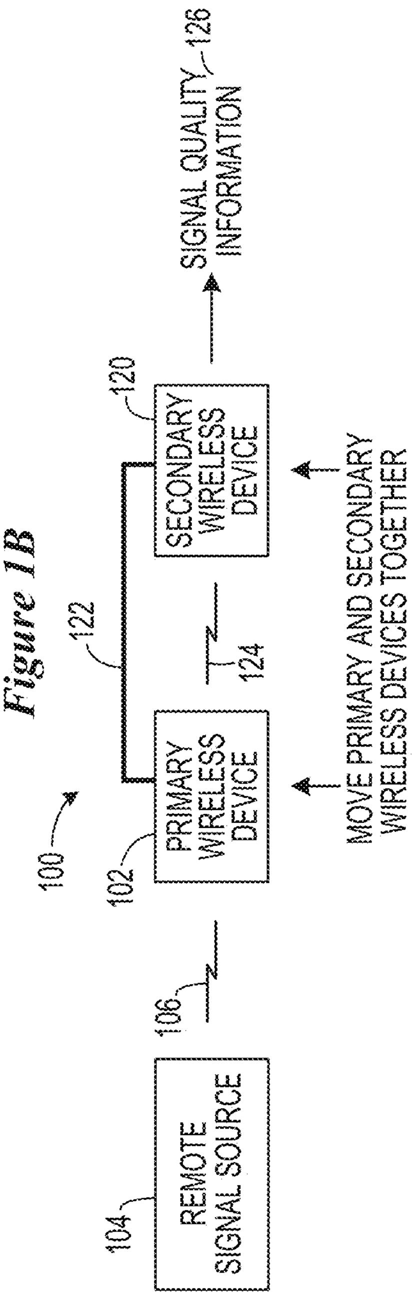
FIG. 1B illustrates a movable apparatus comprising a primary wireless device physically and communicatively coupled to a secondary wireless device in accordance with various embodiments.

FIGS. 1A and 1B illustrate an apparatus 100 comprising a primary wireless device 102 and a secondary wireless device 120 according to various embodiments. The primary wireless device 102 includes a first communication unit 103 configured to effect communication of signals between the primary wireless device 102 and a remote signal source 104. The first communication unit 103 includes an internal antenna coupled to an RF front-end, RF transceiver, and modem (see, e.g., FIGS. 7 and 8) for communicating with the remote signal source 104. In the embodiment shown in FIGS. 1A and 1B, the primary wireless device 102 requires positioning at a premises in order to reliably communicate with the remote signal source 104. For example, the primary wireless device 102 can be wireless CPE (e.g., 5G CPE) or an FWA device to be installed at a home, and the remote signal source 104 can be a base station.

As is shown in FIGS. 1A and 1B, the primary wireless device 102 is physically coupled to a secondary wireless device 120 via a mechanical coupler 122. The mechanical coupler 122, such as a bracket arrangement, is configured to temporarily connect the secondary wireless device 120 to the primary wireless device 102. The secondary wireless device 120 can be a smartphone, a tablet or small computer, for example. The primary and secondary wireless devices 102, 120 remain mechanically coupled while positioning the primary wireless device 102 during an installation process. Upon conclusion of the positioning process, the secondary wireless device 120 and mechanical coupler 122 can be removed from the primary wireless device 102.

The primary wireless device 102 includes a second communication unit 105 which facilitates communication between the primary wireless device 102 and the secondary wireless device 120 via a wireless link 124. The wireless link 124 is also referred to as an over-the-air (OTA) link. The second communication unit 105 includes an antenna coupled to an RF front-end, RF transceiver, and modem (see, e.g., FIG. 7). In some embodiments, the second communication unit 105 is an internal unit of the primary wireless device 102 (see, e.g., FIG. 7). In other embodiments, the second communication unit 105 is configured as an external module which can communicatively couple to the primary wireless device 102 (see, e.g., FIG. 8) via a communication interface (e.g., a USB, PCIe, or M.2 interface).

During the installation process, the primary and secondary wireless devices 102, 120 are moved together as a movable apparatus 100 about the premises in an effort to find a location and position that provides for reliable reception of signals transmitted by the remote signal source 104. To provide power to the primary wireless device 102 during the installation process, a portable power source 108 can be temporarily connected to the primary wireless device 102 (e.g., via a bracket arrangement and a power cable). Use of the portable power source 108 allows the primary and secondary wireless devices 102, 120 to be freely moved about the premises without encumbrances of a power cord connected to the primary wireless device 102.

As the primary and secondary wireless devices 102, 120 are moved about the premises, the primary wireless device 102 receives signals from the remote signal source 104 and generates signal quality parameters. For example, the primary wireless device 102 can generate a Reference Signal Received Power (RSRP) parameter, a Reference Signal Received Quality (RSRQ) parameter, a Signal-to-Interference-plus-Noise Ratio (SINR) parameter or other metric of signal quality. The secondary wireless device 120 can communicate a request to the primary wireless device 102 via the wireless link 124 for the signal quality parameter(s). In response to the request, the primary wireless device 102 can pass the signal quality parameter(s) to the secondary wireless device 120.

Figure 3A:
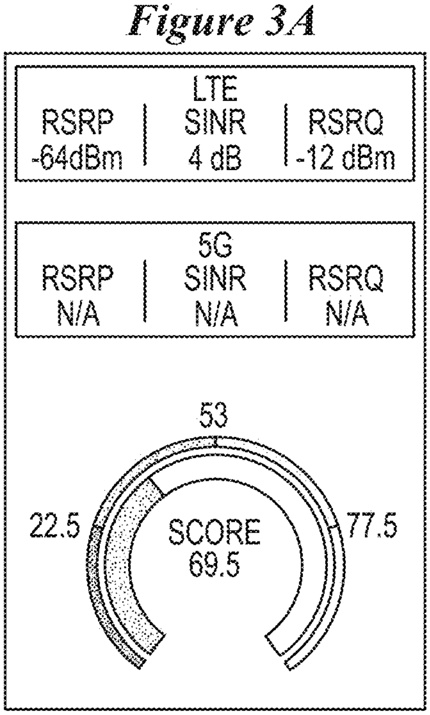
FIG. 3A illustrates a signal quality meter which can be presented on a display of a secondary wireless device of the movable apparatus shown in FIGS. 1A-1B and 2A-2B in accordance with various embodiments.

In some embodiments, the secondary wireless device 120 can output signal quality information 126 in a form perceivable by a human installer (e.g., visual, auditory, tactile). The secondary wireless device 120 can include a display and the signal quality information 126 can be presented on the display in various forms (e.g., numbers, text, graphics). For example, a signal quality meter (see, e.g., FIG. 3A) can be presented on the display to indicate the state of the signal quality information 126 (e.g., poor, acceptable, good, excellent). A quality score can be assigned to the signal quality information 126 and the quality score can be compared against a threshold (e.g., minimum) quality score. The secondary wireless device 120 can include an audio output device that generates sound (e.g., different tones, human speech) indicating the state of the signal quality information 126. The secondary wireless device 120 can include a haptic output device that generates a tactile output (e.g., different sequences of vibratory pulses) indicating the state of the signal quality information 126.

In other embodiments, the primary and secondary wireless devices 102, 120 can be moved about the premises by a robot rather than a human installer. In such embodiments, the secondary wireless device 120 need not include a display, audio output device, or a haptic output device. The signal quality information 126 can be output from the secondary wireless device 120 in the form of a signal (e.g., digital data) suitable for use by the robot.

Figure 2A:
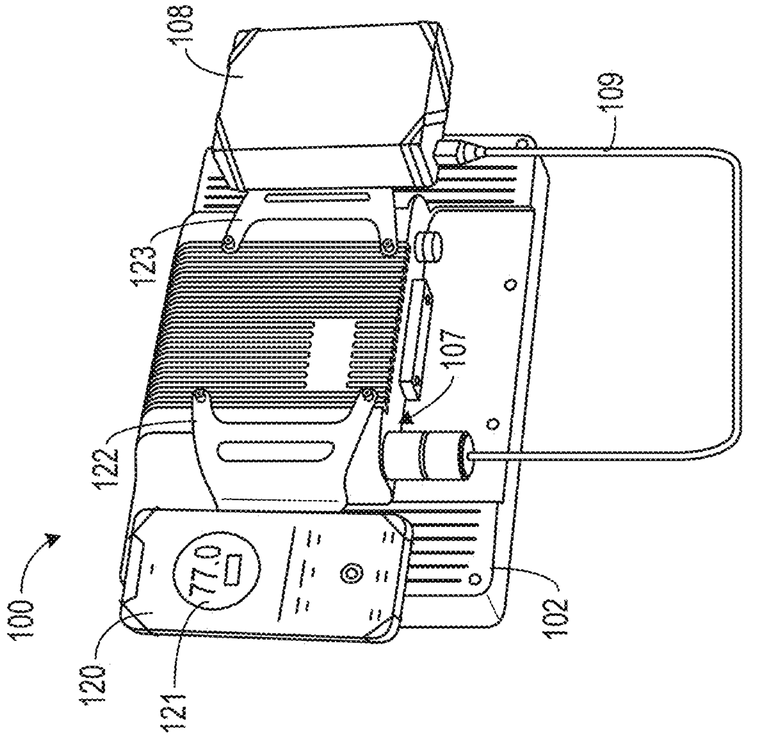
FIG. 2A illustrates a view of a movable apparatus comprising a primary wireless device physically and communicatively coupled to a secondary wireless device in accordance with various embodiments.
Figure 2B:
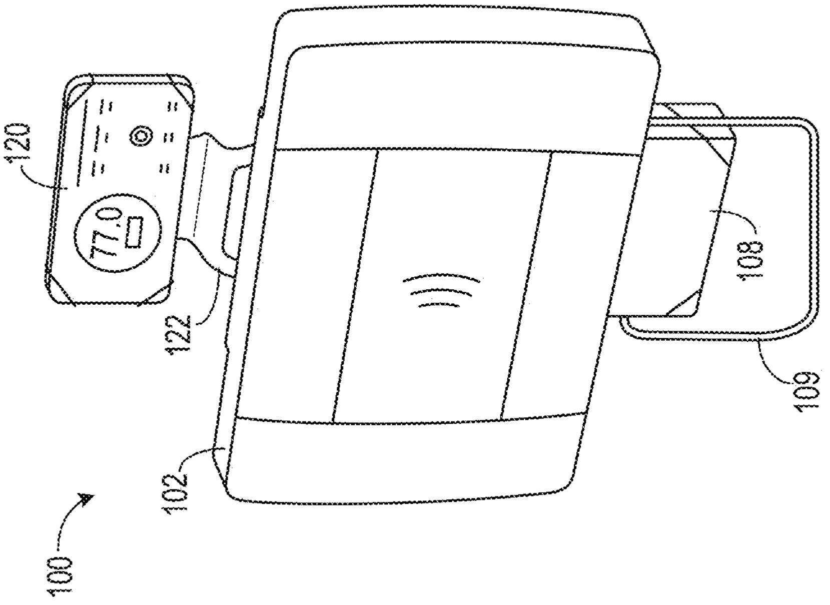
FIG. 2B illustrates a view of a movable apparatus comprising a primary wireless device physically and communicatively coupled to a secondary wireless device in accordance with various embodiments.

FIGS. 2A and 2B illustrate an example apparatus 100 in a horizontal installation configuration and a vertical installation configuration, respectively. In the installation configurations shown in FIGS. 2A and 2B, the secondary wireless device 120 is mounted to a rear panel of the primary wireless device 102 via a bracket 122. In this embodiment, the primary wireless device 102 is an outdoor FWA device and the secondary wireless device 120 is a smartphone. A portable power source 108 is mounted to the rear panel of the primary wireless device 102 by use of a bracket 123. A power cable 109 is connected to the portable power source 108 and to a connector 107 of the primary wireless device 102 that accepts power.

Figure 3B:
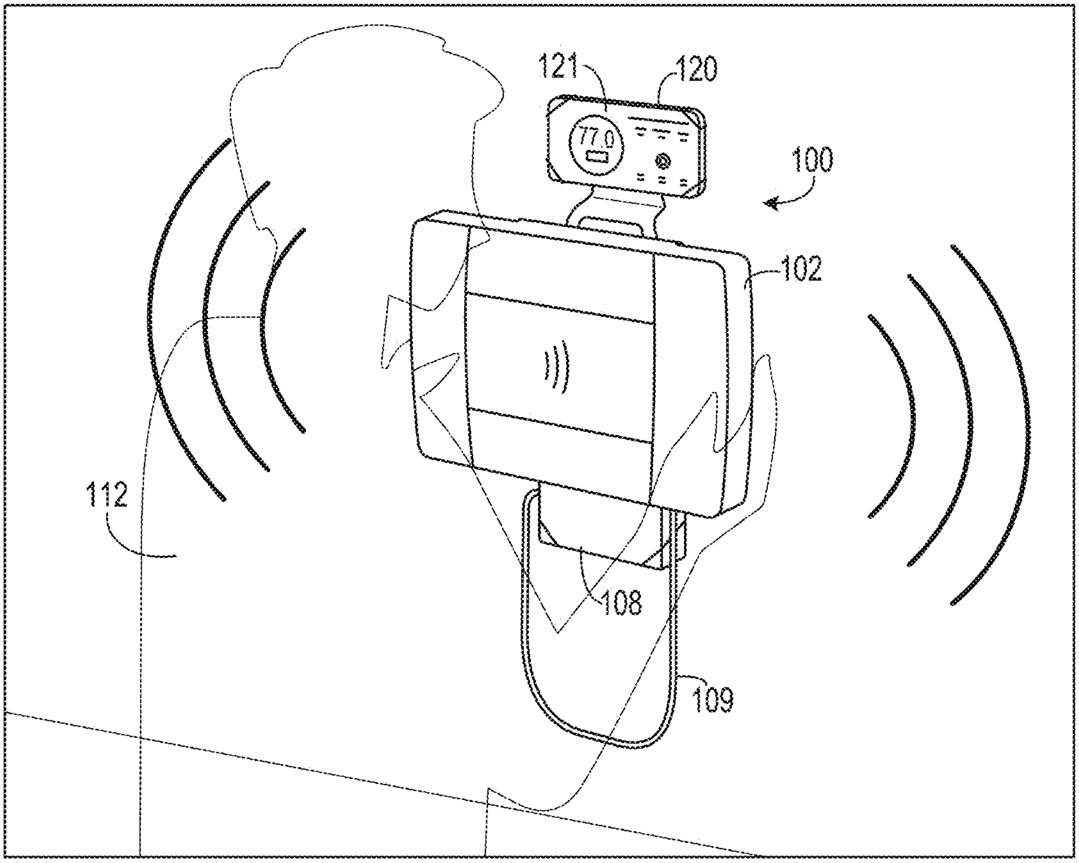
FIG. 3B illustrates a scenario in which a human installer uses the moveable apparatus shown in FIGS. 1A-1B and 2A-2B to produce real-time signal quality information during an installation process in accordance with various embodiments.
Figure 5:
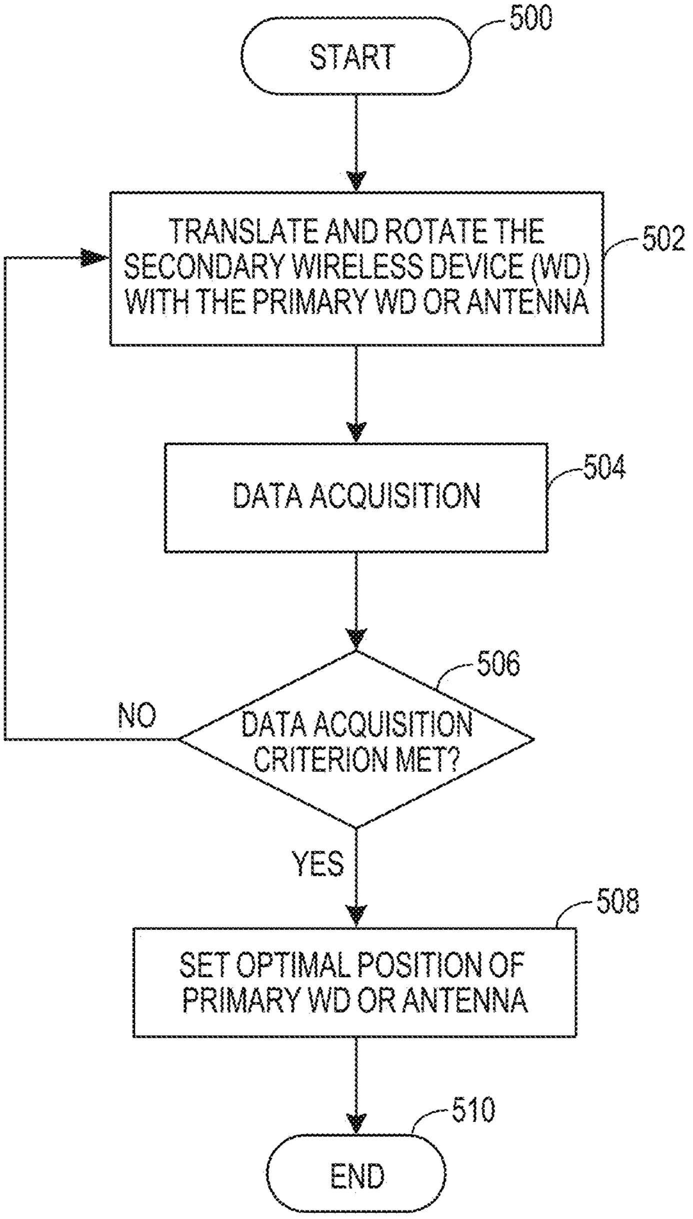
FIG. 5 illustrates a method of performing an installation process using a movable apparatus comprising a secondary wireless device physically coupled to a primary wireless device or an antenna of the primary wireless device in accordance with various embodiments.

FIG. 3B illustrates a scenario in which a human installer 112 uses the apparatus 100 to produce real-time signal quality information during an installation process. The secondary wireless device 120 includes a display 121 which presents signal quality information developed from the signal quality parameters received from the primary wireless device 102. In this illustrative embodiment, a signal quality score is presented on the display 121 (e.g., the higher the score, the better the signal quality). As the apparatus 100 is moved (e.g., translated and rotated) about the premises, the signal quality score changes. The installer 112 continues to move the apparatus 100 about the premises until a location and position is found that produces an acceptable or optimal signal quality score (e.g., meets or exceeds a signal quality threshold, such as a minimum signal quality score). The primary wireless device 102 can then be installed (e.g., mounted to a pole, a wall, or other structure) at that location and position. Additional details of this and other installation processes are shown in FIG. 5, which is described hereinbelow.

Figure 4A:
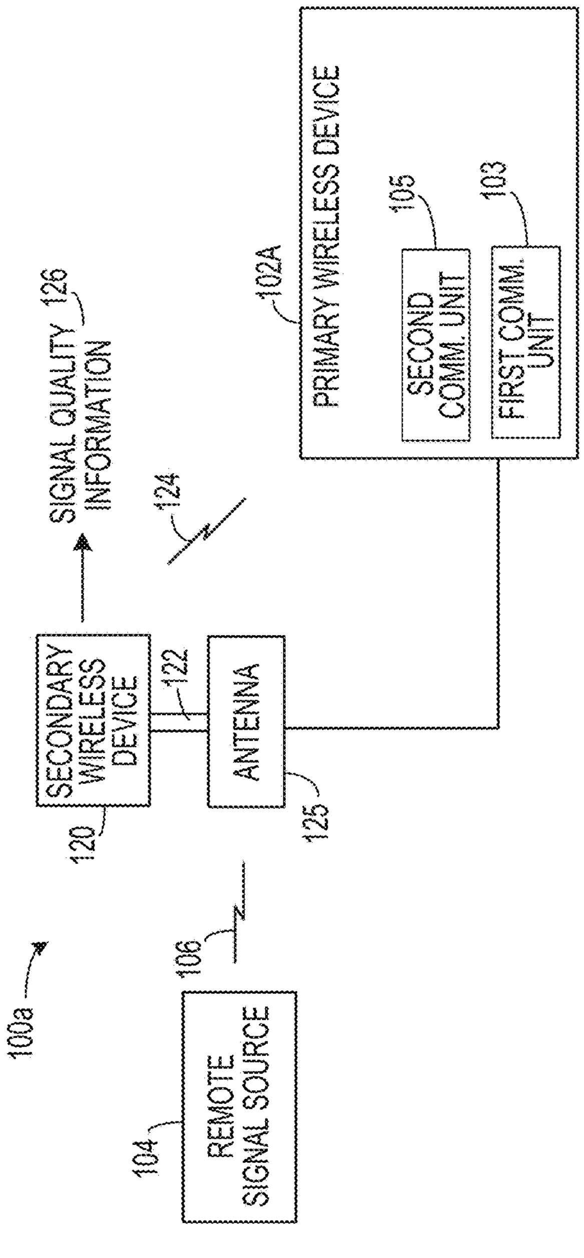
FIG. 4A illustrates a movable apparatus comprising a secondary wireless device physically coupled to an external antenna of a primary wireless device, wherein the primary and secondary wireless devices are communicatively coupled during an installation process in accordance with various embodiments.
Figure 4B:
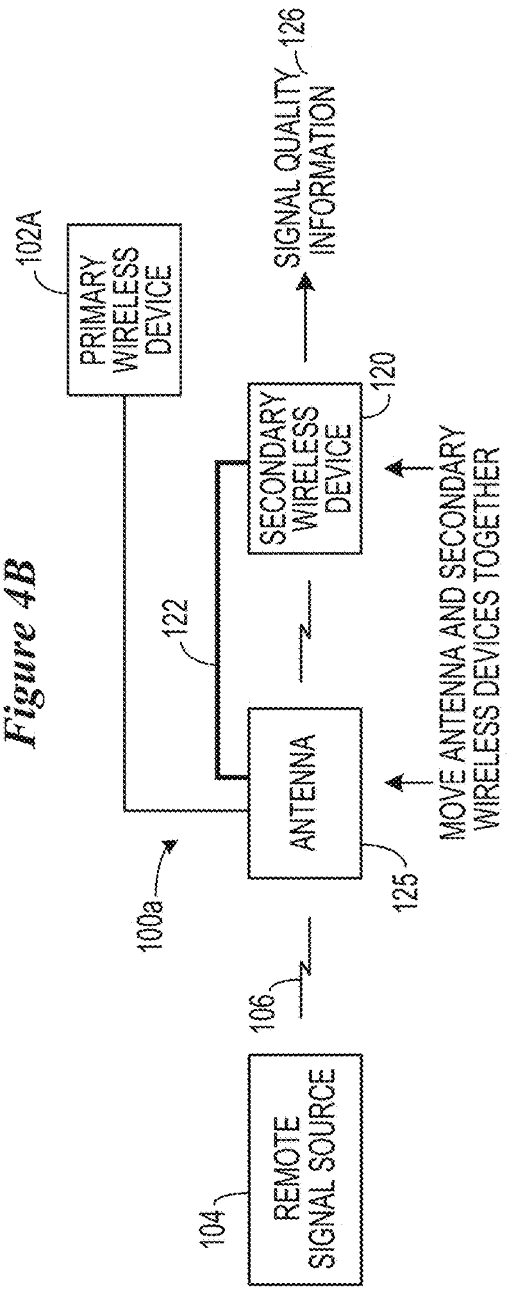
FIG. 4B illustrates a movable apparatus comprising a secondary wireless device physically coupled to an external antenna of a primary wireless device, wherein the primary and secondary wireless devices are communicatively coupled during an installation process in accordance with various embodiments.

FIGS. 4A and 4B illustrate an apparatus 100*a* comprising a primary wireless device 102*a* and a secondary wireless device 120 according to some embodiments. In the illustrative embodiment shown in FIGS. 4A and 4B, the primary wireless device 102*a* is a stationary device which is connected to an external antenna 125. The external antenna 125 is movable relative to the stationary primary wireless device 102*a*. In this illustrative embodiment, the primary wireless device 102 can be situated at any location of the premises because signal quality is dependent on the positioning of the external antenna 125. In one example, the primary wireless device 102*a* can be a satcom receiver and the antenna 125 can be a satellite dish connected to the satcom receiver. In another example, the primary wireless device 102*a* can be indoor CPE connected to an external (e.g., outdoor) antenna 125.

As is shown in FIGS. 4A and 4B, the primary wireless device 102*a* is physically coupled to the antenna 125 via a mechanical coupler 122. The mechanical coupler 122 (e.g., a bracket arrangement) is configured to temporarily connect the secondary wireless device 120 to the antenna 125. As previously discussed, the secondary wireless device 120 can be a smartphone, a tablet or small computer, for example. The secondary wireless device 120 and the antenna 125 remain mechanically coupled during installation of the antenna 125. Upon conclusion of the installation process, the secondary wireless device 120 and mechanical coupler 122 can be removed from antenna 125.

The primary wireless device 102*a* includes a first communication unit 105 which facilitates communication between the primary wireless device 102*a* and the remote signal source 104 via a wireless link 106. The first communication unit 105 includes an RF front-end, RF transceiver, modem, and the antenna 125 (see, e.g., FIG. 10). The primary wireless device 102*a* also includes a second communication unit 105 which facilitates communication between the primary wireless device 102*a* and the secondary wireless device 120 via a wireless link 124. The second communication unit 105 includes an antenna coupled to an RF front-end, RF transceiver, and modem (see, e.g., FIG. 10). In some embodiments, the second communication unit 105 is an internal unit of the primary wireless device 102 (see, e.g., FIG. 10). In other embodiments, the second communication unit 105 is configured as an external module which can communicatively couple to the primary wireless device 102 (see, e.g., FIG. 8) via a communication interface (e.g., a USB, PCIe or M.2 interface).

As the primary wireless device 102*a* and the antenna 125 are moved about the premises, the primary wireless device 102*a* receives signals from the remote signal source 104 and generates signal quality parameters (e.g., RSRP, RSRQ, SINR). The secondary wireless device 120 can communicate a request to the primary wireless device 102 via the wireless link 124 for the signal quality parameter(s). In response to the request, the primary wireless device 102*a* can pass the signal quality parameter(s) to the secondary wireless device 120. The secondary wireless device 120 can output signal quality information 126 in a form perceivable by a human installer (e.g., visual, auditory, tactile) or in a form suitable for use by a robot, as previously discussed.

FIG. 5 illustrates an installation process in accordance with any of the embodiments disclosed herein. The installation process shown in FIG. 5 involves the use of a movable apparatus which can have different configurations. In a first configuration, the movable apparatus includes a secondary wireless device physically attached to a primary wireless device which includes an internal antenna arrangement (see, e.g., FIGS. 1A and 1B). In a second configuration, the movable apparatus includes a secondary wireless device physically attached to an external movable antenna which is connected to the primary wireless device. The primary wireless device in the second configuration can be a fixed or stationary device (see, e.g., FIGS. 4A and 4B).

The installation process shown in FIG. 5 assumes that the primary wireless device is communicatively linked to (e.g., paired with) the secondary wireless device. It is also assumed that the primary and secondary wireless devices are running apps that facilitate OTA messaging between the two devices so that signal quality parameters can be passed from the primary wireless device to the secondary wireless device. It is further assumed that the secondary wireless device is running an app that facilitates the output of signal quality information in a form perceivable by a human installer or a form suitable for a robot programmed to perform the positioning process. In the case of a human installer (e.g., a homeowner), the app running on the secondary wireless device can cause a signal quality score or meter (see, e.g., FIG. 3A) to be presented on a display of the secondary wireless device. Alternatively or in addition, and as discussed above, the app can cause the secondary wireless device to generate an auditory or tactile output indicative of the signal quality.

The installer initiates 500 the installation process which involves grasping the movable apparatus having one of the two configurations discussed above. The installer moves 502 the apparatus about a premises, such as by translating and rotating the apparatus. Translating the apparatus can involve changing the height and/or the lateral position of the apparatus. Rotating the apparatus can involve changing one or both of an azimuth angle and an elevation angle of the apparatus. While the apparatus is moved 502, a data acquisition process 504 is implemented. For the discrete or continuous movement of the apparatus in block 502, the secondary wireless device requests and receives signal quality parameters (e.g., RSRP, RSRQ, SINR) from the primary wireless device via an OTA messaging link established between the primary and secondary wireless devices.

In addition to signal quality parameters, other information can be acquired and recorded by at least one of the primary wireless device, the secondary wireless device, and the installer. Such additional information can include, for example, a timestamp, a GPS coordinate, a height of the primary wireless device, an azimuth angle of the primary wireless device, and an elevation angle of the primary wireless device. In a relatively simple implementation, the installer can perform the data acquisition 504, such as by recording (e.g., mentally or on paper) locations, heights, and orientations (azimuth and elevation angles) of the apparatus and the associated signal quality information. In a more complex example, the secondary wireless device (e.g., a smartphone) can provide a timestamp and include a GPS sensor and an inertial measurement unit (IMU), such as a gyroscope. The GPS sensor can provide the GPS coordinate and the IMU can provide the azimuth and elevation angles. The height data can be provided by the installer. These data and the associated signal quality information can be stored on the secondary wireless device.

A check is made at block 506 to determine if a data acquisition criterion has been met. In some approaches, the data acquisition criterion can be a target signal quality level (e.g., a target SINR). In other approaches, the data acquisition criterion can be a specified iteration value. In further approaches, multiple data acquisition criterion can be used, which can include a target signal quality level and a specified iteration value.

The specified iteration value can correspond to a specified number of times the processes of blocks 502 and 504 are to be implemented at one or more locations of the premises. For example, the installation process may require the installer to move to five different locations of the premises (e.g., five different rooms of a home when installing indoor wireless CPE) and, at each location, change the azimuth angle by turning the apparatus 360° in 10° increments while signal quality and other information are acquired at each increment. The specified iteration value in this example would be set at 180 (5*360/10). In another example, the installation process may require the installer to move to different locations of the premises and, at each location, change the azimuth angle and the elevation angle of the apparatus. For example, the apparatus can be moved to five different locations of the premises. At each location, the azimuth angle can be changed in 10° increments over 360° of movement, and the elevation angle can be changed in 10° increments over a range of 0-90° of movement while signal quality and other information are acquired at each increment. In this example, the specified iteration value would be set at 1800 (5*(360/10*90/10+1), noting that the "+1" accounts for an elevation of 0°).

The processes of blocks 502 and 504 are repeated until the data acquisition criterion has been met. The data acquired at block 504 and constraints of the physical environment at each of the locations of the premises are used by the installer to determine the optimal position to deploy the primary wireless device or external antenna. For example, the data acquired at block 504 can be reviewed (e.g., by the installer) or analyzed (e.g., by the secondary wireless device) to identify the location and apparatus orientations that produced the highest signal quality value. The installer can use the optimal parameters (e.g., GPS coordinate, height, azimuth and elevation angle) to deploy 508 the primary wireless device or external antenna at the optimal position at the premises. The installer terminates the installation process 510, which involves detaching the secondary wireless device from the primary wireless device or the external antenna.

The general installation process shown in FIG. 5 can be implemented as a multistep process which includes a gross locating process and a fine positioning process. The gross locating process seeks to determine locations of a premises that are candidate locations (e.g., kitchen, bedroom, roof, yard, outside wall/structure) for deploying the primary wireless device or external antenna. Considerations for such candidate locations can include, for example, the availability of power outlets, whether the locations can accommodate a mounting structure (e.g., a mounting pole or a wall bracket), and whether the locations are suitable for receiving signals from a remote signal source. Processes 502-506 are performed at each of the locations of interest to determine which of these locations are candidate locations for deploying the primary wireless device or external antenna. A candidate location is a location at which the data acquisition criterion 506 has been met. The gross locating process concludes by identifying one or more candidate locations of the premises. For any of the candidate locations, a fine positioning process can be implemented.

The fine positioning process seeks to optimally position the primary wireless device or antenna at a candidate location. For example, the gross locating process may identify the kitchen of a home as a candidate location for installing a primary wireless device (e.g., 5G CPE). In this example, the kitchen has a power outlet for supplying power to the primary wireless device and a mounting pole for supporting the primary wireless device. The fine positioning process can be used to optimally position the primary wireless device on the mounting pole.

Aspects of the fine positioning process will be described in the context of optimizing the azimuth angle of the primary wireless device at a candidate location, such as a kitchen. Due to physical constraints of the location where the mounting pole is situated in the kitchen, the azimuth angle of the primary wireless device in this example can be changed 502 in 10° increments over 180° of movement. The specified iteration value in this example is set at 19 (180/10+1). As the azimuth angle of the primary wireless device is changed by the installer, signal quality data is acquired 504 at 0° and each of the 10° increments, resulting in 19 sets of data (signal quality and associated azimuth angle data), at which point the data acquisition criterion 506 (specified iteration value of 19) is satisfied.

It may be determined by the installer or the secondary wireless device that azimuth angles of 30° and 110° produced the highest signal quality values. The fine positioning process seeks to determine whether an azimuth angle between 30° and 110° can produce a signal quality value higher than that associated with the azimuth angles of 30° and 110° (a span of 80°). In one example, the azimuth angle of the primary wireless device can be changed in 5° increments over 80° of movement between the azimuth angles of 30° and 110°. In this example, the specified iteration value is set at 16 (80/5). As the azimuth angle of the primary wireless device is changed 502 by the installer, signal quality data (signal quality and associated azimuth angle data) is acquired 504 at each of the 5° increments, resulting in 16 sets of data, at which point the data acquisition criterion 506 (specified iteration value of 16) is satisfied. It can be determined by the installer or the secondary wireless device that an azimuth angle of 90°, for example, produced the highest signal quality value. The azimuth angle of the primary wireless device can be set 508 at 90° by the installer. The fine positioning process can be similarly implemented for optimizing the elevation angle and height of the primary wireless device.

Figure 6:
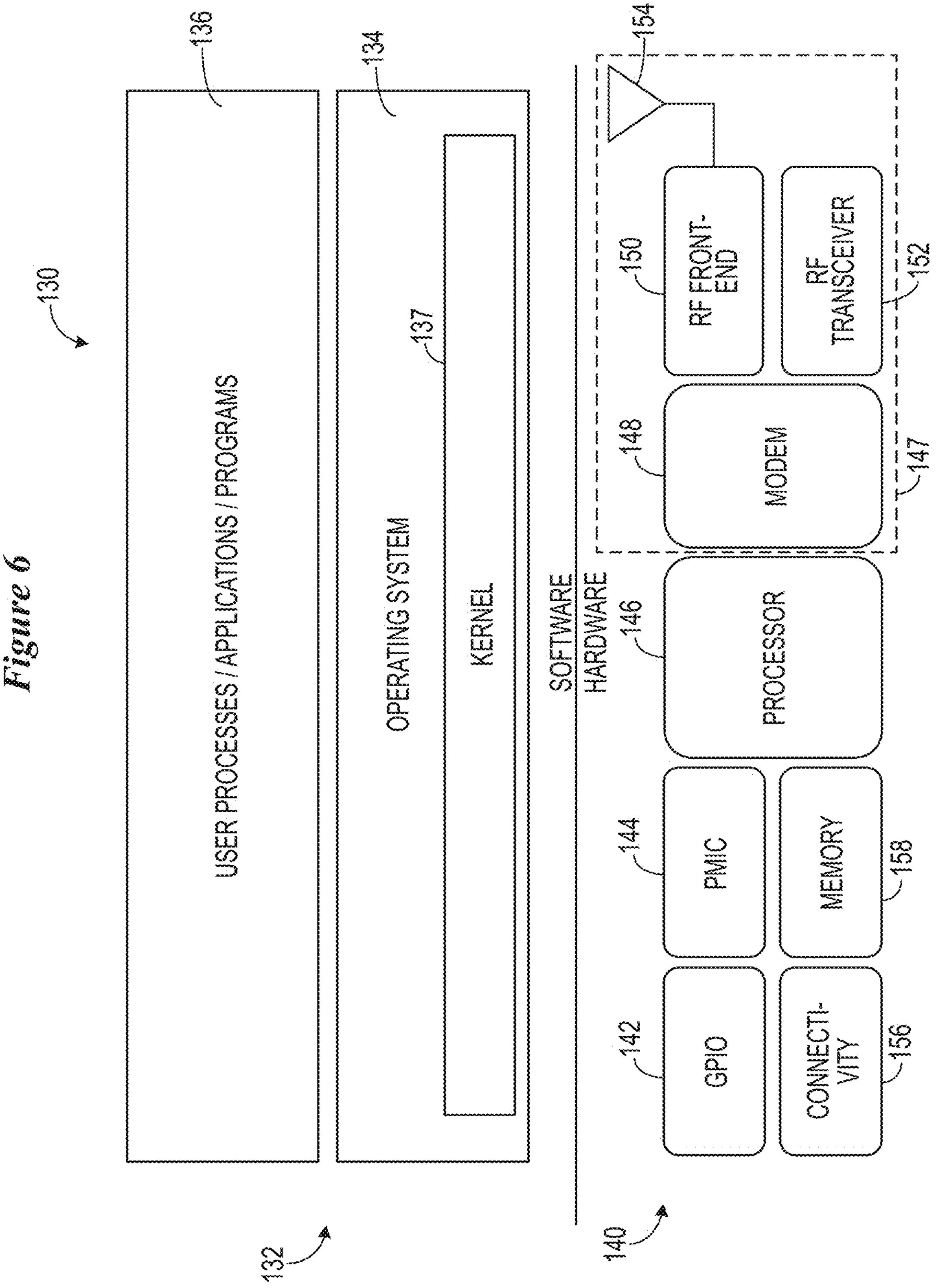
FIG. 6 illustrates hardware and software elements of a wireless device in accordance with various embodiments.

FIG. 6 illustrates basic hardware and software (HW/SW) elements 130 of a wireless device. The HW/SW elements 130 can be incorporated in each of the primary and secondary wireless devices 102, 102*a*, 120 shown in FIGS. 1A, 1B, 4A, and 4B. The HW/SW elements 130 include software elements 132 and hardware elements 140. The software elements 132 include user processes, applications, and programs 136, and an operating system 134 comprising a kernel 137 that manages the hardware and software resources of the wireless device. The hardware elements 140, which are preferably mounted to a PCBA, include general-purpose I/O (GPIO) 142, a power management IC (PMIC) 144, a processor 146, memory 158, and connectivity elements 156 (e.g., a UART, SPI, I2C, PCIe, USB, M.2 elements). The hardware elements 140 also include a communication unit 147 which includes a modem 148, an RF transceiver 152, an RF front-end 150, and an antenna 154.

Figure 7:
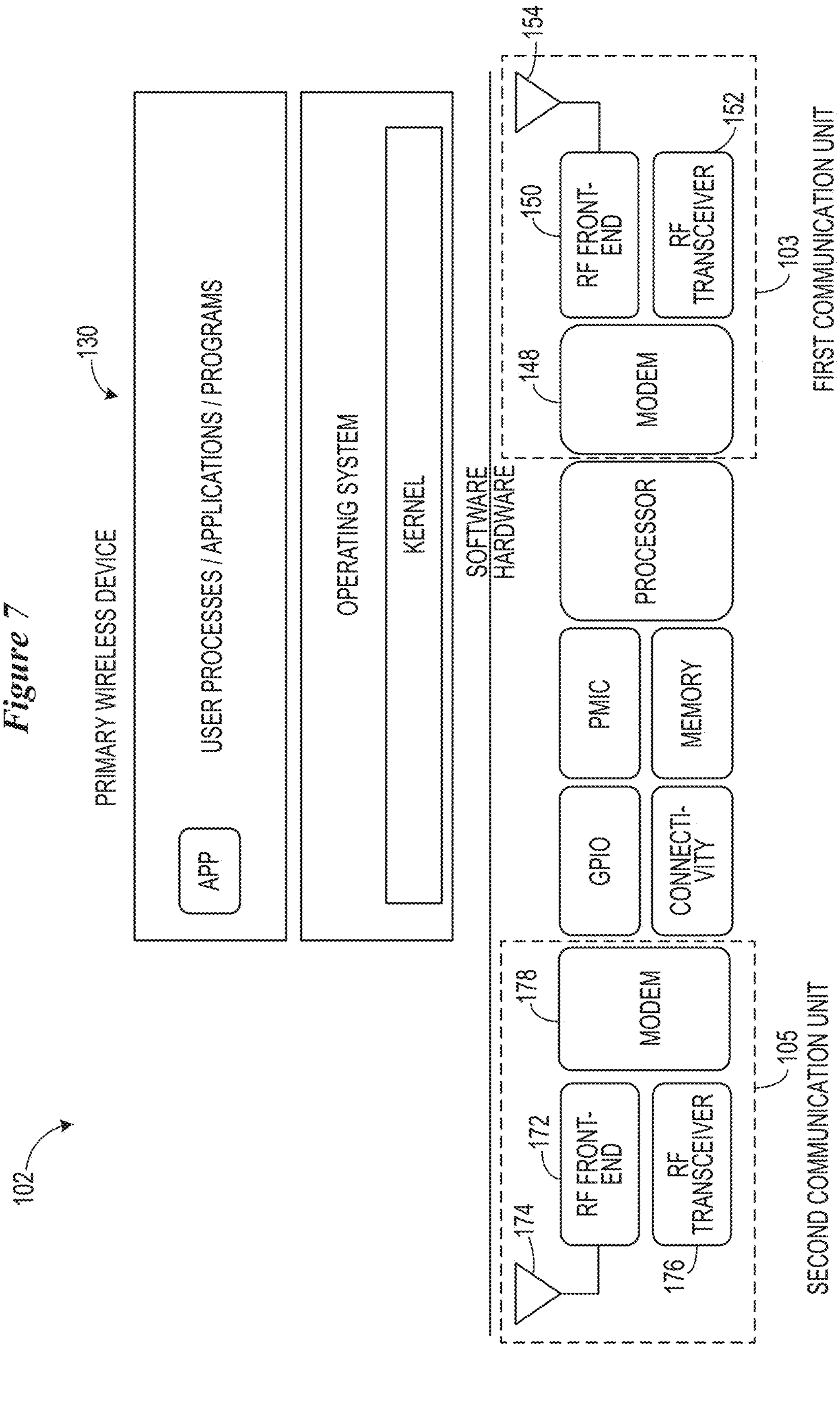
FIG. 7 illustrates hardware and software elements of a primary wireless device in accordance with various embodiments.

FIG. 7 illustrates an embodiment of a primary wireless device 102 which includes the HW/SW elements 130 shown in FIG. 6 (some reference numbers not repeated for clarity). In FIG. 7, the modem 148, RF transceiver 152, RF front-end 150, and antenna 154 define a first communication unit 103 which is configured to communicate with a remote signal source 104, as is shown in FIGS. 1A and 4A. The communication protocol between the primary wireless device 102 and the remote signal source 104 can be, but is not limited to, Wi-Fi, cellular (e.g., LTE/5G/6G), or a satcom protocol.

The primary wireless device 102 also includes a second communication unit 105, as is shown in FIG. 1A. The second communication unit 105 includes a modem 178, RF transceiver 176, RF front-end 172, and an antenna 174. The second communication unit 105 facilitates wireless communication between the primary wireless device 102 and a secondary wireless device 120 (e.g., a smartphone). The communication protocol between the primary and secondary wireless devices 102, 120 can be, but is not limited to, Wi-Fi, Bluetooth, Zigbee, or UWB (Ultra-wideband). In the embodiment shown in FIG. 7, the second communication unit 105 is an internal unit of the primary wireless device 102.

Figure 8:
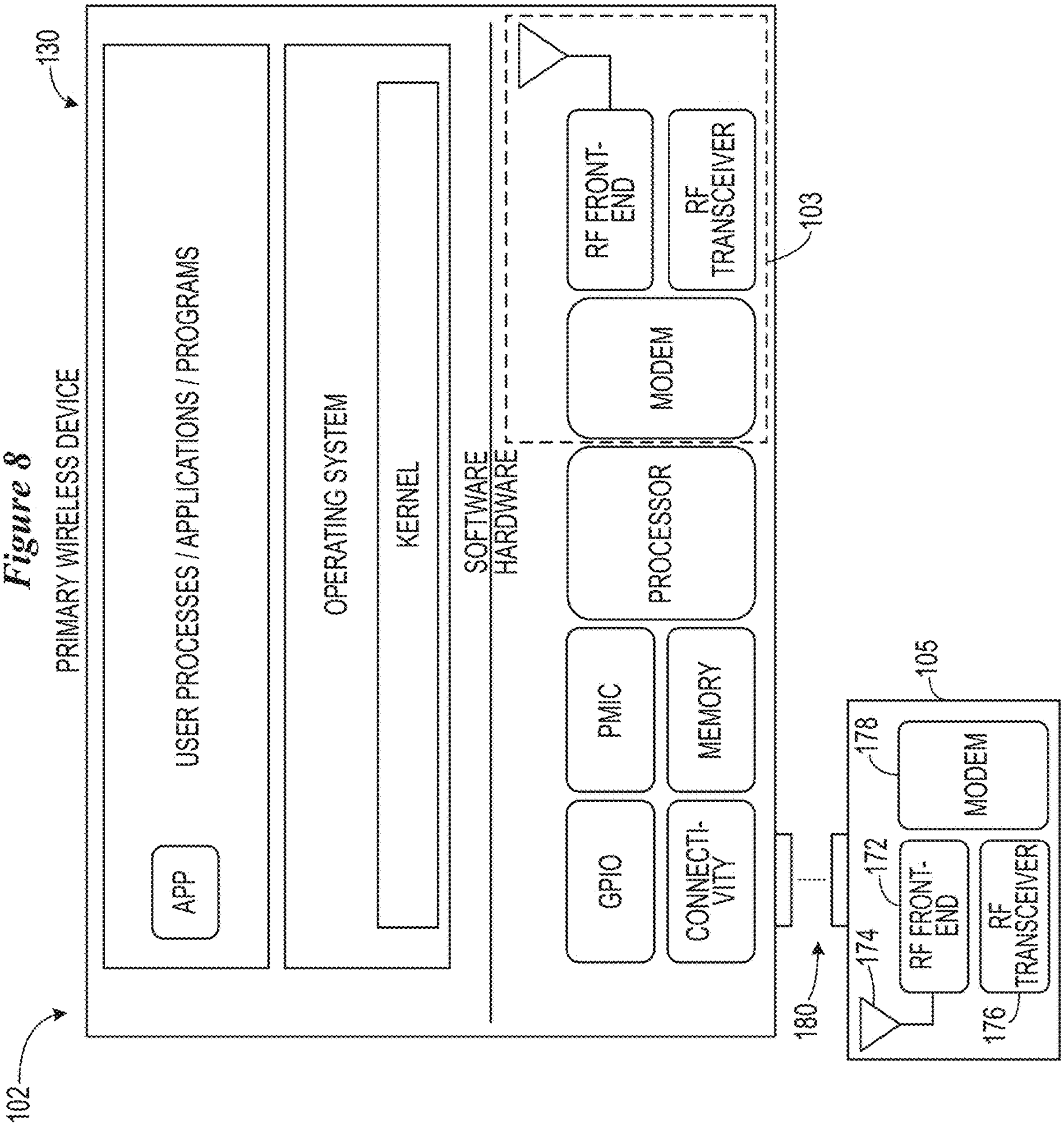
FIG. 8 illustrates hardware and software elements of a primary wireless device including a detachable communication module in accordance with various embodiments.

FIG. 8 illustrates an embodiment of a primary wireless device 102 which includes the HW/SW elements 130 shown in FIG. 6 (some reference numbers not repeated for clarity). In the embodiment shown in FIG. 8, the primary wireless device 102 includes a second communication unit 105 configured as a communication module which includes the modem 178, RF transceiver 176, RF front-end 172, and the antenna 174. The second communication unit 105 can be communicatively coupled to the primary wireless device 102 via an interface 180, such as a USB, PCIe, or M.2 interface. Implementing the second communication unit 105 as a communication module obviates the need to integrate the components of the second communication unit 105 into the hardware 140 of the primary wireless device 102.

FIG. 9 illustrates an apparatus 100 which includes the primary wireless device 102 and the secondary wireless device 120. The apparatus 100 shown in FIG. 9 illustrates a representative implementation of the apparatus 100 shown in FIGS. 1A and 1B. In the example embodiment shown in FIG. 9, the secondary wireless device 120 is physically connected to the primary wireless device 102 in a manner previously described. The primary wireless device 102 is communicatively coupled to the secondary wireless device 120 via an OTA link 124 established between the second communication unit 105 of the primary wireless device 102 and a communication unit 147 of the secondary wireless device 120.

During an installation process, the apparatus 100 is moved about a premises in an effort to find a location and position for the primary wireless device 102 that provides for reliable reception of signals transmitted by the remote signal source 104. While moving the apparatus 100 about the premises, the primary wireless device 102 is in communication with the remote signal source 104 and generates signal quality parameters that change as the location and position/orientation of the primary wireless device 102 changes. The signal quality parameters are passed from the primary wireless device 102 to the secondary wireless device 120 via the OTA link 124 established between the second communication unit 105 and the communication unit 147. In some embodiments, the secondary wireless device 120 can include a display 121 which can display signal quality information that is viewable by the installer during the installation process. The apparatus 100 can be used to implement the processes shown FIG. 5.

Figure 10:
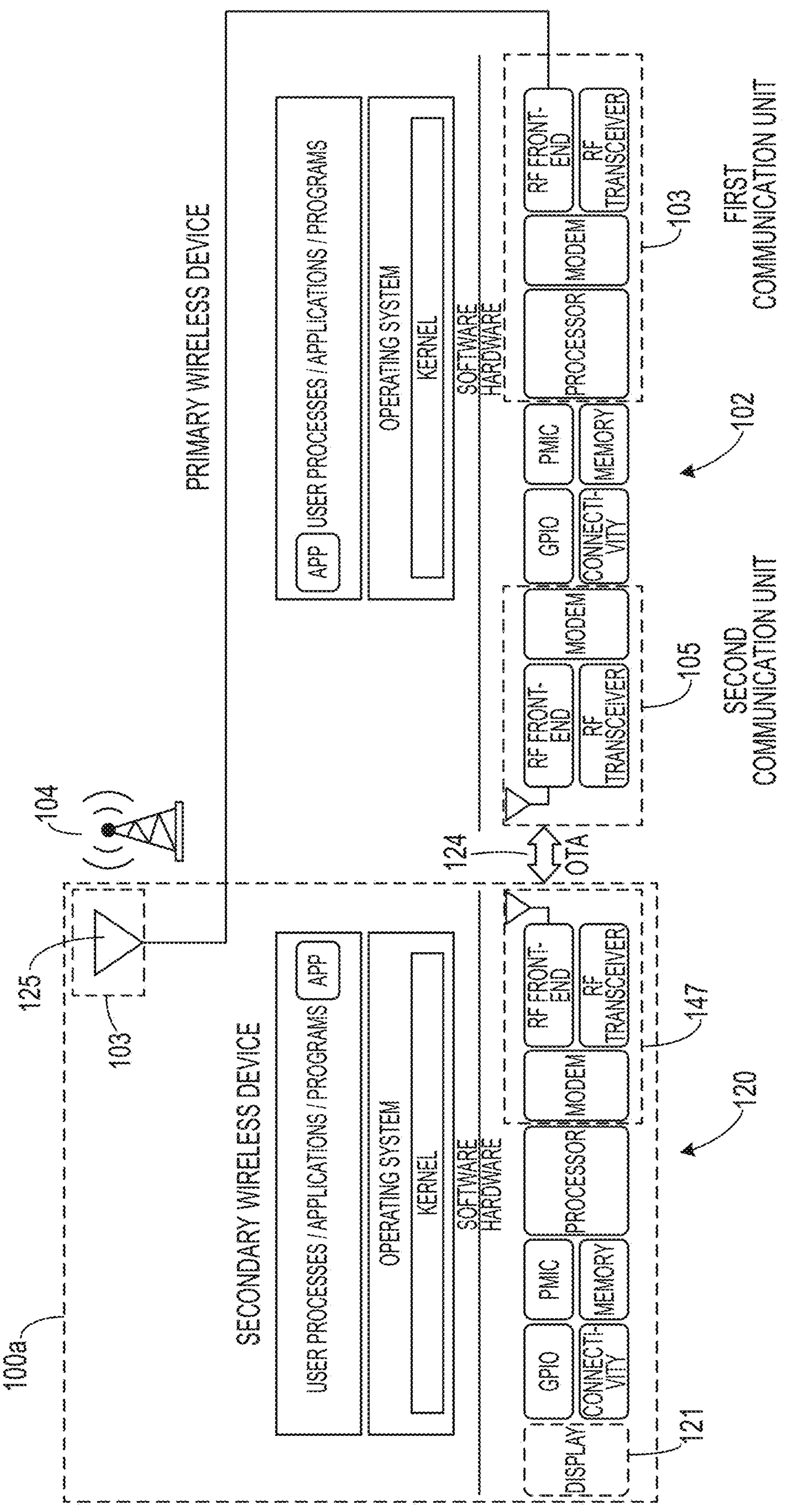
FIG. 10 illustrates a movable apparatus comprising a secondary wireless device physically coupled to an external antenna of a primary wireless device, wherein the primary and secondary wireless devices are communicatively coupled during an installation process in accordance with various embodiments.

FIG. 10 illustrates an apparatus 100*a* which includes an antenna 125 of the primary wireless device 102 and the secondary wireless device 120. The apparatus 100*a* shown in FIG. 10 illustrates a representative implementation of the apparatus 100*a* shown in FIGS. 4A and 4B. In the implementation shown in FIG. 10, the first communication unit 103 of the primary wireless device 102 includes an external antenna 125 which can be moved by the installer during the installation process. As is shown in FIG. 10, the secondary wireless device 120 is physically connected to the antenna 125 in a manner previously described. The primary wireless device 102 is communicatively coupled to the secondary wireless device 120 via an OTA link 124 established between the second communication unit 105 of the primary wireless device 102 and a communication unit 147 of the secondary wireless device 120.

During an installation process, the apparatus 100*a* is moved about a premises in an effort to find a location and position for the antenna 125 that provides for reliable reception of signals transmitted by the remote signal source 104. While moving the apparatus 100*a* about the premises, the primary wireless device 102 is in communication with the remote signal source 104 and generates signal quality parameters that change as the location and position/orientation of the antenna 125 changes. The signal quality parameters are passed from the primary wireless device 102 to the secondary wireless device 120 via the OTA messaging link 124 established between the second communication unit 105 and the communication unit 147. In some embodiments, the secondary wireless device 120 includes a display 121 which can display signal quality information that is viewable by the installer during the installation process. The apparatus 100*a* can be used to implement the processes shown FIG. 5.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed embodiments may be practiced other than as explicitly described herein.

Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "various embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." The term "and/or" means one or all of the listed elements or a combination of at least two of the listed elements. The phrases "at least one of," "comprises at least one of," and "one or more of" followed by a list refers to any one of the items in the list and any combination of two or more items in the list.

What is claimed is:

1. A method, comprising:

providing a primary wireless device that communicates with a remote signal source;

providing a secondary wireless device detachably coupled to, and in wireless communication with, the primary wireless device;

moving the primary and secondary wireless devices together about a premises;

producing, by the primary wireless device, signal quality information for a signal received from the remote signal source while moving the primary and secondary wireless devices;

communicating the signal quality information to the secondary wireless device;

producing, by the secondary wireless device, an output indicative of the signal quality information; and positioning the primary wireless device at a location of the premises that produces signal quality information which meets or exceeds a signal quality threshold.

2. The method according to claim 1, wherein producing the output by the secondary wireless device comprises producing a human-perceivable indication of the signal quality information.

3. The method according to claim 1, wherein producing the output by the secondary wireless device comprises displaying the signal quality information on a display of the secondary wireless device.

4. The method according to claim 1, wherein:

producing the output by the secondary wireless device comprises producing a data signal indicative of the signal quality information; and the moving and acquiring processes are repeated until a data acquisition criterion is met.

5. The method according to claim 1, comprising moving the primary and secondary wireless devices to a plurality of different locations of the premises and acquiring, by the secondary wireless device, signal quality information and additional information at each of the plurality of different locations, wherein the additional information comprises one or more of a timestamp, a GPS coordinate, a height of the primary wireless device, an azimuth angle of the primary wireless device, and an elevation angle of the primary wireless device.

6. The method according to claim 5, wherein the moving and acquiring processes are repeated until a data acquisition criterion is met.

7. The method according to claim 1, wherein:

the primary wireless device comprises wireless customer premise equipment and the remote signal source is a base station; and the secondary wireless device comprises a smartphone, a tablet, or a portable computer.

8. A method, comprising:

providing a primary wireless device that receives a signal from a remote signal source, the primary wireless device operably coupled to a movable antenna;

providing a secondary wireless device detachably coupled to the antenna and in wireless communication with the primary wireless device;

moving the antenna and the secondary wireless device together about a premises;

producing, by the primary wireless device, signal quality information for a signal received from the remote signal source while moving the antenna together with the secondary wireless device;

communicating the signal quality information to the secondary wireless device;

producing, by the secondary wireless device, an output indicative of the signal quality information; and positioning the antenna at a location of the premises that produces signal quality information which meets or exceeds a signal quality threshold.

9. The method according to claim 8, wherein the primary wireless device comprises a satellite receiver, the remote signal source is a satellite, and the antenna is a satellite dish.

10. The method according to claim 8, wherein producing the output by the secondary wireless device comprises producing a human-perceivable indication of the signal quality information.

11. The method according to claim 8, wherein producing the output by the secondary wireless device comprises displaying the signal quality information on a display of the secondary wireless device.

12. The method according to claim 8, comprising moving the antenna and secondary wireless device to a plurality of different locations of the premises and acquiring, by the secondary wireless device, signal quality information and additional information at each of the plurality of different locations, wherein the additional information comprises one or more of a timestamp, a GPS coordinate, a height of the antenna, an azimuth angle of the antenna, and an elevation angle of the antenna.

13. The method according to claim 12, wherein the moving and acquiring processes are repeated until a data acquisition criterion is met.

14. An apparatus, comprising:

a primary wireless device configured to communicate with a remote signal source and generate signal quality information for a signal received from the remote signal source;

a secondary wireless device configured to detachably couple to, and wirelessly communicate with, the primary wireless device;

the secondary wireless device comprising a processor configured to:

acquire signal quality information from the primary wireless device while the primary and secondary wireless devices are moved together about a premises; and produce an output indicative of the signal quality information.

15. The apparatus according to claim 14, comprising a portable power source detachably connected to the primary wireless device via a mechanical coupler.

16. The apparatus according to claim 14, wherein the secondary wireless device comprises:

a smartphone, a tablet, or a portable computer; and a display for graphically presenting the output indicative of the signal quality information.

17. The apparatus according to claim 14, wherein the primary wireless device comprises an internal communication unit configured to facilitate wireless communication with the secondary wireless device.

18. The apparatus according to claim 14, wherein the primary wireless device comprises an interface coupled to an external communication module configured to facilitate wireless communication between the primary wireless device and the secondary wireless device.

19. The apparatus according to claim 14, wherein the primary wireless device comprises wireless customer premise equipment and the remote signal source is a base station.

20. An apparatus, comprising:

a primary wireless device configured to communicate with a remote signal source and to generate signal quality information for a signal received from the remote signal source, the primary wireless device operably coupled to a movable antenna;

a secondary wireless device configured to detachably couple to the antenna, the secondary wireless device configured to wirelessly communicate with the primary wireless device;

the secondary wireless device comprising a processor configured to:

acquire signal quality information from the primary wireless device while the antenna and the secondary wireless device are moved together about a premises; and produce an output indicative of the signal quality information.

21. The apparatus according to claim 20, wherein the secondary wireless device comprises:

a smartphone, a tablet, or a portable computer; and a display for graphically presenting the output indicative of the signal quality information.

22. The apparatus according to claim 20, wherein the primary wireless device comprises an internal communication unit configured to facilitate wireless communication with the secondary wireless device.

23. The apparatus according to claim 20, wherein the primary wireless device comprises an interface coupled to an external communication module configured to facilitate wireless communication between the primary wireless device and the secondary wireless device.

24. The apparatus according to claim 20, wherein the primary wireless device comprises wireless customer premise equipment and the remote signal source is a base station.

25. The apparatus according to claim 20, wherein the primary wireless device comprises a satcom receiver and the remote signal source is a satellite.

* * * * *